United States Patent [19]

Preusker

[11] Patent Number: 4,576,214

[45] Date of Patent: Mar. 18, 1986

[54] NON-SKID DEVICE, PARTICULARLY FOR PNEUMATICALLY TIRED VEHICLE WHEELS USED ON ICE AND SNOW

[75] Inventor: Werner Preusker, Atzelgift, Fed. Rep. of Germany

[73] Assignee: Niveau AG, Basel, Switzerland

[21] Appl. No.: 568,492

[22] Filed: Jan. 5, 1984

[30] Foreign Application Priority Data

Sep. 3, 1983 [DE]  Fed. Rep. of Germany ....... 3331855
Sep. 23, 1983 [DE]  Fed. Rep. of Germany ....... 8327385

[51] Int. Cl.⁴ ............................................. B60C 27/00
[52] U.S. Cl. .................................. 152/213 A; 24/498; 81/176.1; 152/216; 152/226; 152/230; 403/349
[58] Field of Search .............. 152/216, 213 R, 213 A, 152/214, 217, 218, 220, 221, 222, 226, 225 R, 225 C, 227, 228, 229, 230; 81/15.8, 90 C, 90 D, 176.1; 24/490, 498, 647, 523, 504, 573; 301/37 S, 37 N, 37 H, 41 R, 44 R, 44 T, 47, 50, 118, 121; 403/348, 349, 330; 292/303, 304

[56] References Cited

U.S. PATENT DOCUMENTS

| 1,945,410 | 1/1934 | Antoni | 301/118 X |
| 3,133,581 | 5/1964 | Jenks | 152/216 |
| 4,228,838 | 10/1980 | Zerlauth | 152/216 |
| 4,278,122 | 7/1981 | Vagias | 152/226 X |
| 4,405,006 | 9/1983 | Preusker | 152/216 X |

Primary Examiner—Edward Kimlin
Assistant Examiner—Thomas Bokan
Attorney, Agent, or Firm—Toren, McGeady, Stanger, Goldberg & Kiel

[57] ABSTRACT

An anti-skid device is intended for use on pneumatic tires when the tires are used on ice and snow. The device includes a supporting disk with anti-skid arms pivotally displaceable about axes extending parallel to the axis of the wheel on which the pneumatic tire is mounted. The supporting disk is fixed to the wheel by a fixing disk and a retaining ring mounted on the wheel rim. The combination of the fixing disk and the retaining ring secure the supporting disk on a hub formed on the fixing disk. The supporting disk is arranged so that there is a certain amount of clearance relative to the hub for performing eccentric rotary movement for adapting the device to any elastic deformation of the pneumatic tire.

5 Claims, 9 Drawing Figures

NON-SKID DEVICE, PARTICULARLY FOR PNEUMATICALLY TIRED VEHICLES WHEELS USED ON ICE AND SNOW

BACKGROUND OF THE INVENTION

The invention relates to a non-skid device, particularly for pneumatically tires vehicle wheels used on ice and snow, which comprises a supporting disk fixable to the wheel disk or rim having a plurality of equidistant, radially non-skid arms from a prebent profile, engaging over the tires tread, externally carrying on its free ends gripping profiles or spikes made from plastics or some other suitable material.

Apart from snow chains, winter or friction tires are used for driving motor vehicles in winter on snow-covered uphill and downhill gradients. Snow chains are not very popular, because it is often difficult to fit them to the vehicle tires and they must be used in such a way that the road is not damaged, i.e. the snow chains have to be removed on dry road sections following the snow-covered or ice-covered sections. In addition, when travelling on dry road surfaces, snow chains are subject to considerable wear and also do not permit a high speed. Particularly in the case of roads which become covered with ice at short notice, i.e. ice surfaces produced by drizzle falling on frozen road surfaces, snow chains and winter tires are often not available. It is also not always possible to use spiked tires.

Apart from snow chains and winter tires starting aids are known, but cannot replace snow chains and winter tires. These starting aids, which comprise clamp straps mounted on the tires, merely serve to permit a vehicle to be driven a short distance out of mud or snow.

SUMMARY OF THE INVENTION

The present invention solves the problem of providing a fixing means for an anti-skid device, of the aforementioned type, which can permanently remain on the wheels of a vehicle in readiness for taking the actual anti-skid device with the anti-skid arms, which permits effortless fitting and removal of the actual anti-skid device without it being necessary to move the vehicle and which adapts to the squeezing or pressing movements of the vehicle tires. In addition, the fixing means is to be made available, which is constantly held on the wheels of the vehicle in readiness for receiving the actual anti-skid device with the anti-skid arms.

According to the invention, this problem is solved by an anti-skid device of the aforementioned type,
(a) the anti-skid arms are arranged on a supporting disk provided with a central opening so as to be pivotable in a small range about axes parallel to the wheel disk bearing axis;
(b) for fixing the supporting disk to the wheel disk or rim, a circular fixing disk with a plurality of openings for the rim screws, wheel studs, etc. is provided, which centrally carries a circular hub having a smaller diameter than the fixing disk, said hub having circumferentially at a distance from the fixing disk and adjacent to its upper edge a plurality of bulge-like shoulders with sliding and guiding paths arranged below the same and tapering conically from the insertion openings in the direction of the hub circumference and which carry the supporting disk with the anti-skid arm surrounding the hub and which is secured by means of a retaining ring mounted on the hub, having locking webs insertable into the sliding and guiding paths of the hub and bringing about a bayonet-like locking, with conically tapering portions extending towards the insertion openings and having on its inner wall face at least one leaf spring-like latch which, in the locked position of the retaining ring of the fixing disk, engages in a recess in the hub circumference and is supported against undesired unlocking by a stop member and can be transferred by means of an unlocking key from the locking position into an unlocking position;
(c) the supporting disk with the anti-skid arms is arranged with clearance on the hub of the fixing disk for carrying out eccentric rotary movements.

Using a fixing means constructed in this way, the fitting of an anti-skid device comprising a supporting disk with a plurality of anti-skid arms is effortless and does not involve the exertion of force. As the fixing means comprising the fixing disk and the retaining ring remains on the rim, for mounting the supporting disk with the anti-skid arms it is merely necessary to release the retaining ring from the fixing disk fixed to the wheel rim. This is followed by the fitting of the supporting disk to the hub of the fixing disk. By means of the then fitted retaining ring, the supporting disk is locked to the fixing disk in such a way that the supporting disk is held with clearance on the hub of the fixing disk and between the latter and the retaining ring. As a result of the bayonet-like locking between the fixing disk and the retaining ring, the anti-skid device comprising the supporting disk with the anti-skid arms is reliably secured. The locking means is released by means of an unlocking key, which has two bent portions, by means of which the leaf spring-like latches can be moved out of their locking position. The fixing disk with the hub and the mounted retaining ring can constantly remain on the wheel rim of the vehicle, whereas the actual anti-skid device is fitted when required.

It is particularly advantageous that the supporting disk with the anti-skid arms is arranged with clearance on the fixing disk hub. Due to the fact that the supporting disk is held with a relatively large clearance on the fixing disk hub, the supporting disk is in a position to perform eccentric movements, because the supporting disk with the anti-skid arms must also perform the squeezing movements of the tires during the operation of the anti-skid device and must not therefore be rigidly arranged or fixed to the rim. Due to the fact that the supporting disk is held with a clearance on the fixing disk hub, the supporting disk can perform tumbling movements to adapt to the squeezing movements of the tires. This ensures that the anti-skid arms of the anti-skid device always assume a position in the operating state, in which the arms engage on the side wall surface of the tire and engage over the tire tread.

According to another advantageous embodiment of the invention, the element of the anti-skid device for fixing the supporting disk has a fixing disk connected to the wheel disk or rim and is provided with lockable mounts for the supporting disk. The fixing disk is connected in a non-detachable manner with the wheel disk or rim and forms part of the wheel. As the fixing disk and the retaining ring remain on the rim in this embodiment, for fitting the supporting disk with the anti-skid arms, it is merely necessary to release the retaining ring from the fixing disk connected to the wheel rim. This is followed by the mounting of the supporting disk on the fixing disk hub. By means of the then fitted retaining ring, the supporting disk is locked to the fixing disk in such a way that the supporting disk is held with a clearance of the fixing disk hub and between the fixing disk and retaining ring.

BRIEF SUMMARY OF THE DRAWINGS

The invention is described in greater detail hereinafter relative to non-limitative embodiments and the attached drawings, wherein shown are.

DETAILED DESCRIPTION OF THE INVENTION

Figure 1:
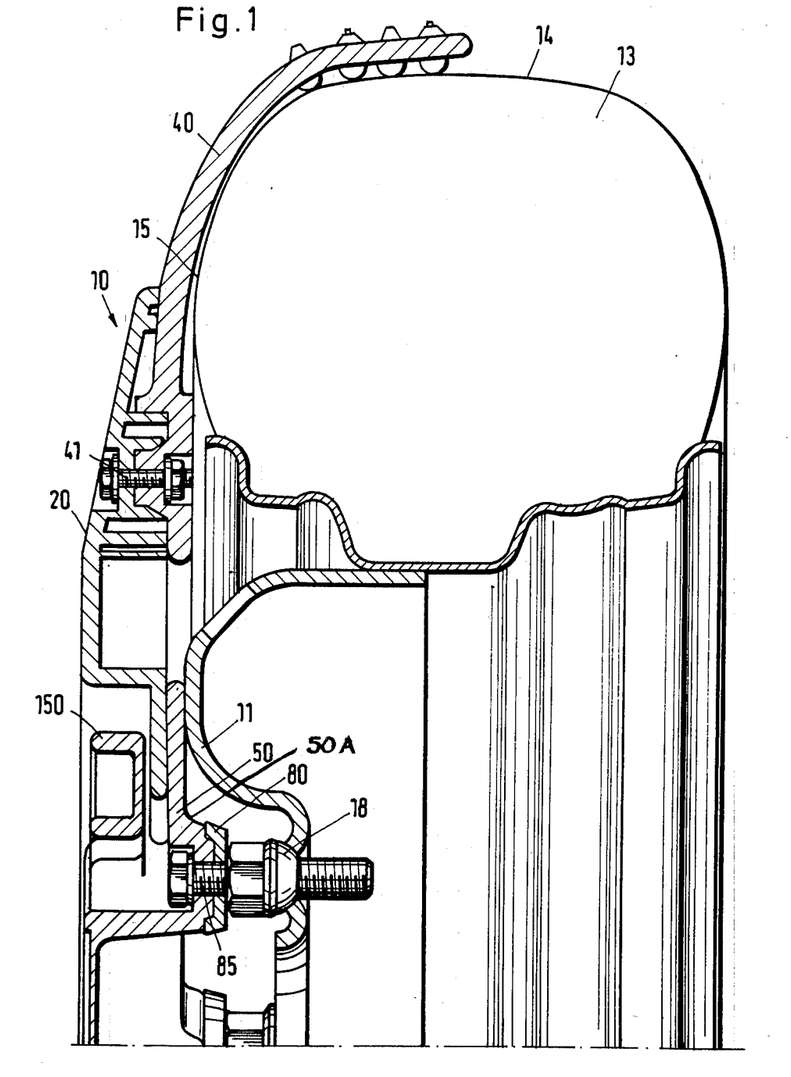
FIG. 1 a partially vertical section of a vehicle wheel with the anti-skid arms of an anti-skid device overlapping the tire tread.
Figure 2:
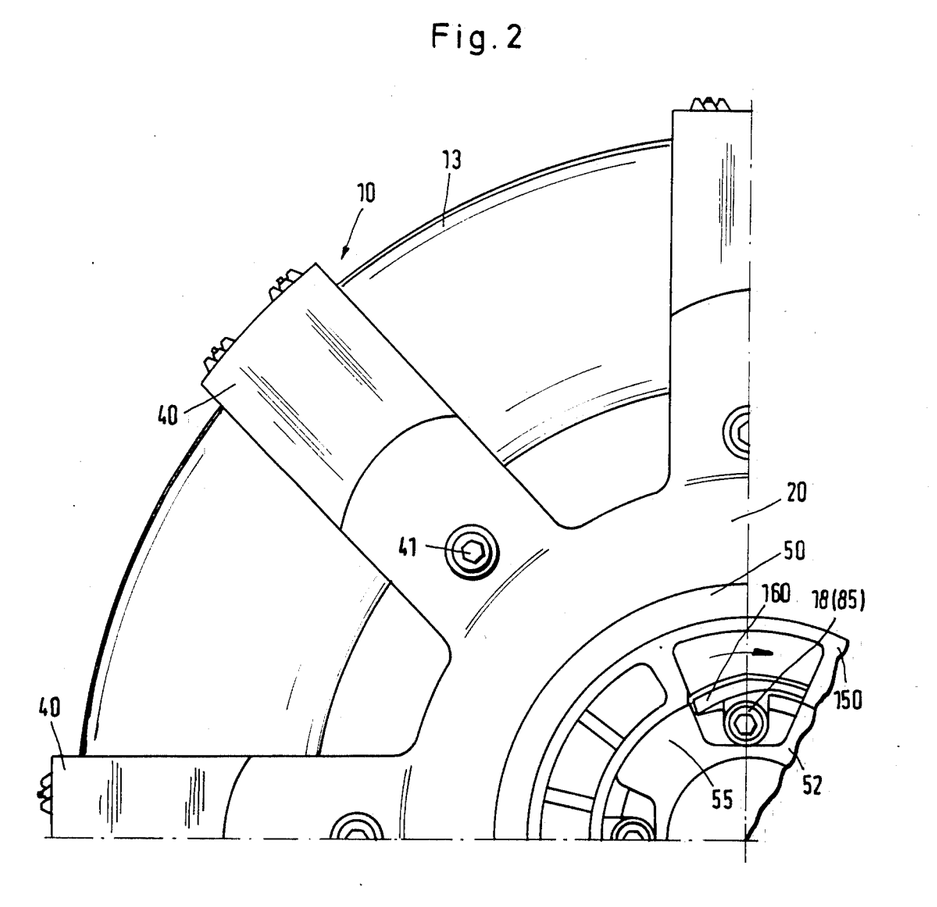
FIG. 2 a plan view of part of the supporting disk of the anti-skid device carrying the anti-skid arms.

As is shown in FIGS. 1 and 2, the anti-skid device 10 comprises an annular supporting disk 20 provided with a central opening to which are fixed a plurality of radially oriented anti-skid arms 40, which are equidistantly spaced from one another and are pivotable in a small region about axes 41 running parallel to the wheel disk bearing axis. This pivotability of the anti-skid arms within a small range makes it possible to fit the anti-skid device with the vehicle stationary. During the first revolutions of the vehicle wheel, anti-skid arms 40 all assume an equidistant spacing, even if during fitting in the region of the tire tread on a substrate, such as e.g. a road, the anti-skid arms are positioned laterally of the tire tread.

The anti-skid device is fixed to a wheel provided with a tire 13 and which simultaneously represents the rim. Wheel 11 is provided with a brake part not shown in the drawing. The tread area of tire 13 is designated 14 and the outside tire surface 15 (FIG. 1).

Each anti-skid arm 40 is fixed to the supporting disk 20 by means of stud-like or rivet-like connecting means. A detachable fixing of arms 40 to supporting disk 20 is also possible, in order to be able to replace the worn arms 40. As is shown in FIG. 2, there are eight anti-skid arms 40 on supporting disk 20, but the number of such arms can be of a random nature. However, there must be at least two anti-skid arms. All the anti-skid arms are at the same angular distance from one another.

Each anti-skid arm 40 is made from a resilient elastic material, such as e.g. spring steel, so that an elastic bending down of the free edge portion of each anti-skid arm 40 is possible in the region of tread 14 of tire 13. Anti-skid arms 40 are preshaped in such a way, that after attaching the anti-skid device 10 to a vehicle wheel, the arms overlap the tire tread 14 by their free ends. Other suitable materials can be used for making the anti-skid arms 40, apart from spring steel. Thus, the anti-skid arms 40 can be made from corresponding suitable plastics material.

On the free ends, the anti-skid arms 40 externally have gripping profiles, so that a good grip is obtained. These gripping profiles can also be in the form of spikes.

Figure 3:
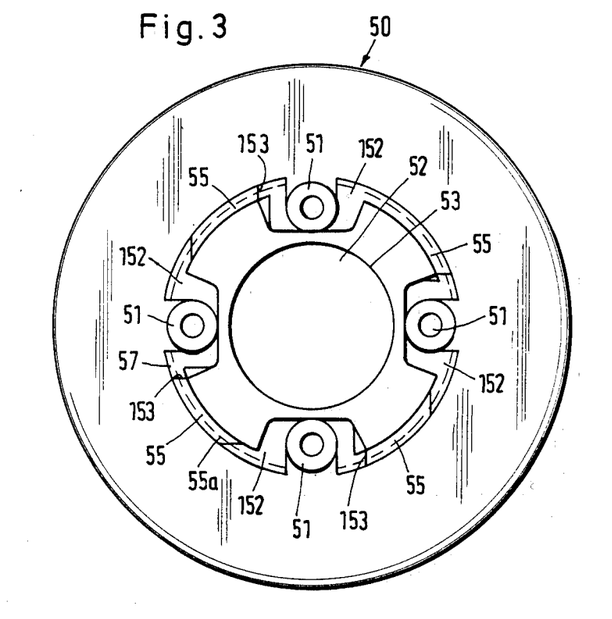
FIG. 3 a plan view of the fixing disk with the hub of the fixing means for the anti-skid device.
Figure 4:
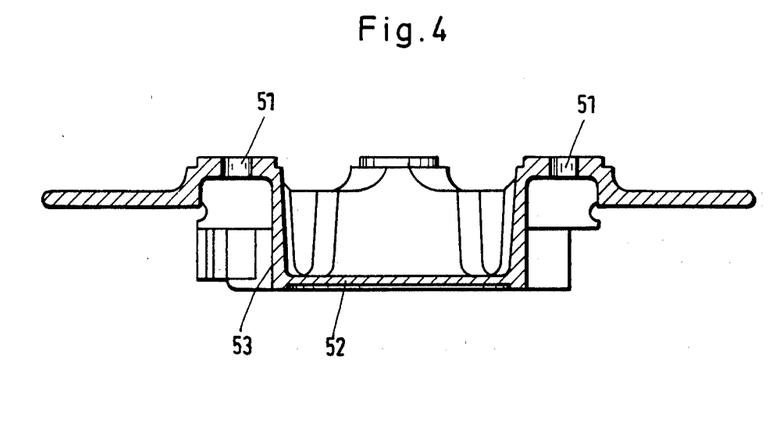
FIG. 4 a vertical section through the fixing disk.
Figure 5:
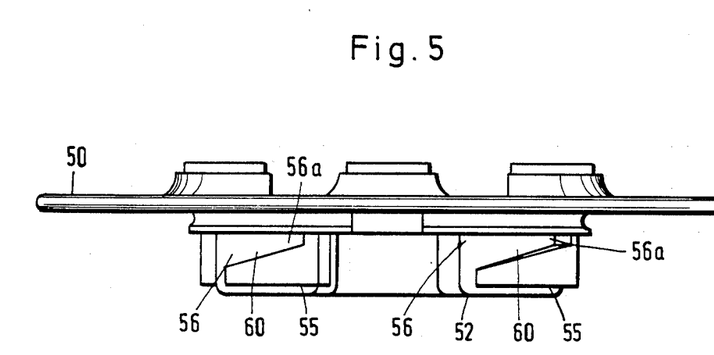
FIG. 5 a side view of the fixing disk.
Figure 7:
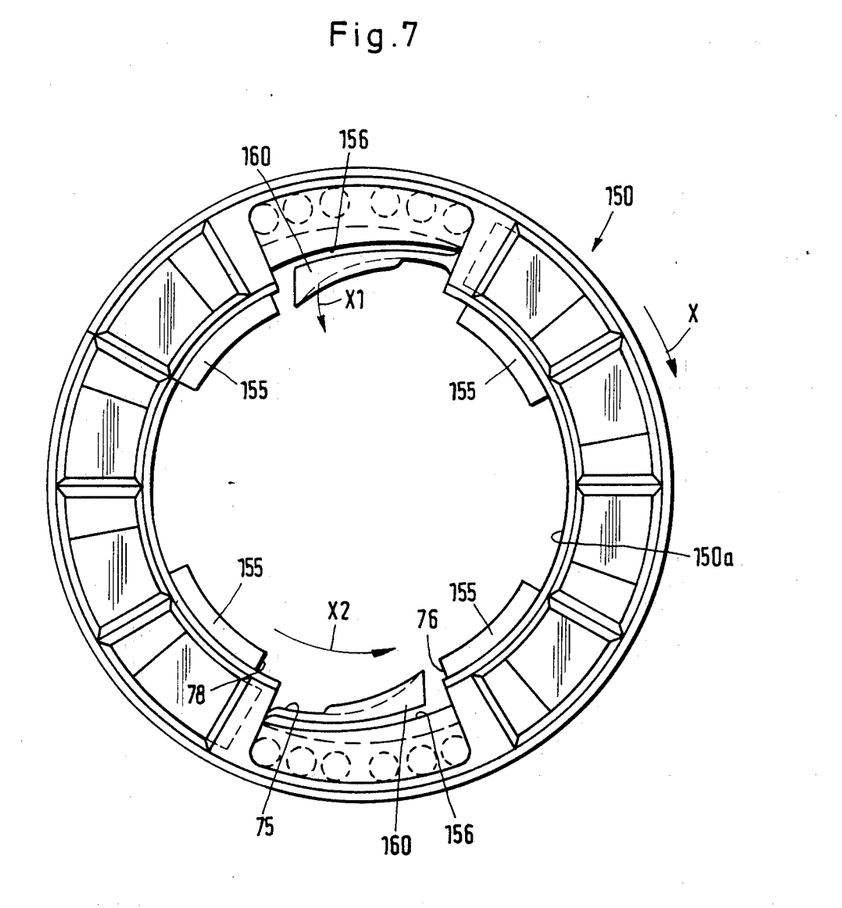
FIG. 7 a plan view of the retaining ring of the fixing means for the anti-skid device.

The fixing means for the anti-skid device 10 on a vehicle rim 11 comprises a fixing disk 50 and retaining ring 150 (FIGS. 3 and 7). According to another embodiment of the invention, the fixing disk 50 is an integral component of the vehicle wheel. The wheel and fixing disk then form a rolled or shaped part.

Fixing disk 50 is provided with a plurality of openings 51, which are used for the passage of rim screws, wheel studs, etc. 18. As is shown in FIG. 1, for fixing the fixing disk 50, the rim screws or wheel studs 18 have bores with an internal thread for receiving the fastening screws 85, by means of which the fixing disk 50 can be fixed to wheel rim 11.

The circular fixing disk 50 centrally has a cross-sectionally circular hub 52, which is constructed as a cylindrical shaped member and forms an integral part of the fixing disk 50. Hub 52 has a diameter, which is smaller than the radially outer diameter of fixing disk 50.

On its outer circumference and in fact adjacent to the upper all-round edge 53, hub 52 has a plurality of equidistantly spaced bulge-like shoulders 55. In the embodiment of FIG. 3, there are four bulge-like shoulders 55 projecting laterally from the hub circumference on hub 52 of fixing disk 50.

Below each bulge-like shoulder 55 is formed a sliding and guiding path 60, which is constructed as a recess and has an insertion opening 56, on which the path 60 tapers conically towards the end area, so that the insertion opening 56 is larger than the end area 56a. The recess forming the sliding and guiding path 60 then has a wedge-shaped configuration and is bounded in the area adjacent to fixing the disk 50 by a torus 57. The end area 56a of the sliding and guiding path 60 also has a limitation in the form of a stop member, although this is not absolutely necessary.

The torus 57, which is shaped on to the outer circumference of hub 52, simultaneously constitutes the upper boundary for the supporting disk 20 mounted on hub 52 of fixing disk 50 (FIG. 3). In the vicinity of the openings 51, torus 57 is interrupted, because part of each opening 51 passes as a partial bore into hub 52 (FIG. 3).

All the sliding and guiding paths 60 below the bulge-like shoulders 55 are so constructed and arranged, that their insertion openings 56 face in each case the preceding end area 56a.

Each bulge-like shoulder 55 is advantageously provided in the upper area with a bent portion 55a to facilitate the fitting of retaining ring 150. Hub 52 of fixing disk 50 is used for receiving the supporting disk 20 with the anti-skid arms 40 of the anti-skid device 10 and for receiving the retaining ring 150.

Figure 6:
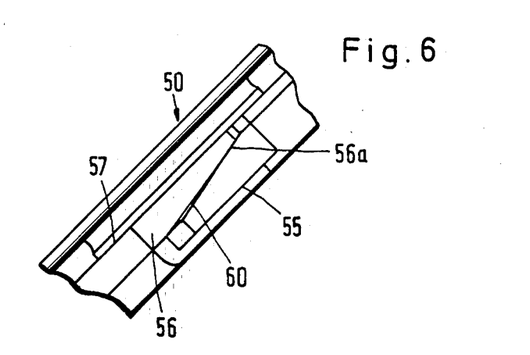
FIG. 6 a closure region on the fixing disk.

Supporting disk 20 of anti-skid device 10 is fitted to fixing disk 50 secured by means of retaining ring 150. The external diameter of ring 150 is somewhat smaller or the same as the fixing disk diameter, has on its radially inner wall face 150A a plurality of locking webs 155, whose number corresponds to the number of bulge-like shoulders 55 or the number of sliding and guiding paths 60 on the hub 52 of fixing disk 50. These locking webs 155 are constructed in such a way, that they can be so inserted into the sliding and guiding paths 60, that there is a bayonet-like locking between retaining ring 150 and hub 52 or fixing disk 50 (FIG. 7). The locking webs 155 have a wedge-shaped configuration so that with the retaining ring 150 mounted on fixing disk 50, the conically tapering end portions of each locking web 155 faces the insertion opening 56 of the recess forming the sliding and guiding paths 60 between the bulge-like shoulder 55 and torus 57, so that on rotating retaining ring 150 about its vertical central axis in the direction of arrow X, locking webs 155 are introduced into the sliding and guiding paths 60, so that the bayonet-like locking is achieved (FIGS. 6 and 7).

In order to be able to fix the retaining ring 150 on hub 52 of fixing disk 50 in such a way that the locking webs 155 of retaining ring 150 can be introduced into the sliding and guiding paths 60, the locking webs 155 have a length corresponding to the distance between two bulge-like shoulders 55 of fixing disk 50. In this way, the locking webs 155 can be passed between in each case two bulge-like shoulders 55 when the retaining ring 150 is in the fitted position, until said ring engages with torus 57 and the locking webs 155 can be introduced into the recesses forming the sliding and guiding paths 60.

In order to prevent automatic detachment of retaining ring 150 from hub 52 or fixing disk 50, ring 150 is provided with additional arresting means, which are constructed as leaf spring-like latches 160 in the form of resilient elastic tongues, which are arranged in recesses 156 on the inner wall face 150a of retaining ring 150. The arrangement and construction of these leaf spring-like latches 160 is such, that when the retaining ring 150 is mounted on hub 52 of fixing disk 50, but is still in the unlocked position, the leaf spring-like latches 160 are pressed by the bulge-like shoulders 55 on hub 52 into their recesses 156 on the inner wall face 150a of retaining ring 150. On locking retaining ring 150 by rotating it, the leaf spring-like latches 160 come to rest in the vicinity of recesses 152 which are formed on the circumference of hub 52. As latches 160 have the natural tendency to spring out of their recesses 156 in the direction of arrow X1, latches 160 come to rest in recesses 152 on hub 52 and form there the locking system provided that the free ends of the leaf-spring-like latches 160 engage with stop members 153, which define the recesses 152 in hub 52. The free ends of latches 160 engaging in these recesses with stop members 153 consequently ensure that the retaining ring 150 is released counter to its rotation direction for locking and cannot be removed from hub 52. There can be a random number of leaf spring-like latches 160 on the inner wall face 150a of retaining ring 150. In the embodiment of FIG. 7, there are two leaf spring-like latches 160, which are arranged equidistantly on the inner wall face 150a of retaining ring 150. The number of recesses 152 on the circumference of hub 52 of fixing disk 50 corresponds to the number of latches 160.

The spring-like latches 160 are manufactured simultaneously with the retaining ring 150, the latter being made from plastics with a resilient elastic behaviour in the case of tongue-like constructions, and this also applies to the latches 160.

In place of the leaf spring-like latches 160, it is also possible to use differently constructed locking means. Thus, for example, it is possible to use radially displaceable and spring loadable pins, which engage in corresponding recesses of the circumference of hub 52 of fixing disk 50. Special precautions must then be taken to prevent unlocking, in that the locking pins must be drawn back into their initial position to enable retaining ring 150 to be moved from fixing disk 50.

Figure 8:
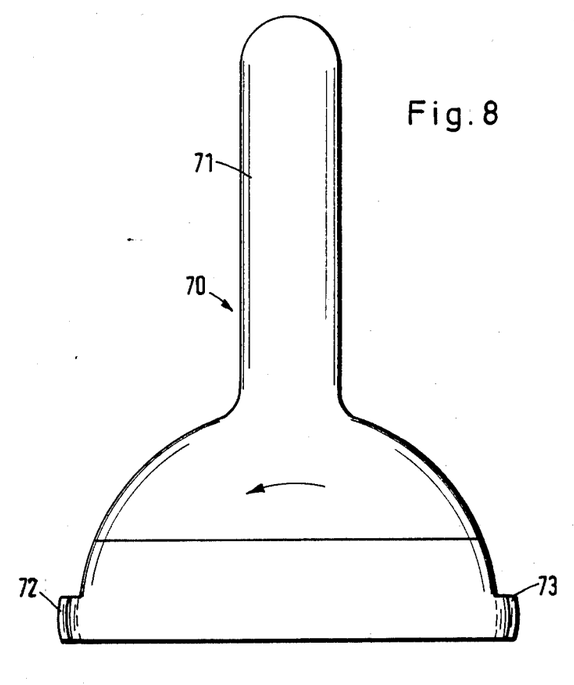
FIG. 8 a plan view of an unlocking key.
Figure 9:
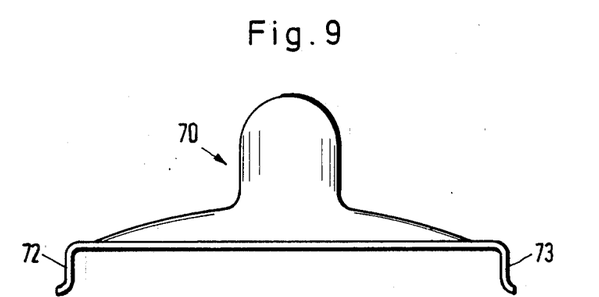
FIG. 9 an end view of the unlocking key.

To be able to remove retaining ring 150 from fixing disk 50, it is necessary to transfer the leaf spring-like latches 160 from their locking position into their initial position in the recesses 156 on the inner wall face 150a of retaining ring 150. For this purpose a locking key 70 of FIGS. 8 and 9 is provided and comprises a grip-like handle 71, on whose one free end there are two spaced pressure tongues 72, 73, which are arranged approximately perpendicularly to the handle 71. The distance between these two pressure tongues 72, 73 corresponsds to the spacing of the facing leaf spring-like latches 160, so that the pressure tongues 72, 73 can be introduced into the two recesses 152 on hub 52. According to FIG. 7, the two recesses 152 have additional recesses 75 on hub 52, into which can be introduced the two pressure tongues 52, 53 of unlocking key 70.

When pressure tongues 72, 73 of unlocking key 70 have been introduced into the recesses 75, and key 70 is rotated in the direction of arrow X2 (FIG. 7), the two leaf spring-like latches 160 located in recesses 152 of hub 52 are forced out of said recesses 152 and moved into recesses 156 on the inner wall face 150a of retaining ring 150. Latches 160 are introduced into their recesses 156 until, in the end area of the movement path of the two pressure tongues 52, 53 a stop member 76 is released, against which the two pressure tongues 72, 73 are engaged. Tongues 72, 73 have engaged with the stop members 76 and the unlocking key 70 is rotated further in the direction of arrow X2, then the pressure tongues 72, 73 also move the retaining ring 150 and on further rotation move the locking web 155 out of the sliding and guiding paths 60 of fixing disk 50 until the locking webs 150 come to rest between the bulge-like shoulders 55, so that in this position it is possible to remove retaining ring 150 from hub 52.

The mounting of retaining ring 150 on hub 52 also takes place by means of unlocking key 70, by introducing pressure tongues 72, 73 of key 70, into recesses 75 and on turning key 70 in the direction of arrow X (FIG. 7), the tongues 72, 73 move the retaining ring 150 until locking webs 155 are located in the sliding and guiding paths 60 and the bayonet joint has been formed. In the fixing area of the leaf spring-like latches 160, recesses 75 have stop members 78 for the movement of retaining ring 150 by pressure tongues 72, 73 of unlocking key 70 (FIG. 7).

As is shown in FIG. 1, on its wall face 50A remote from hub 52, fixing disk 50 has in the vicinity of the rim screw or wheel stud openings 51 spacing rings 80, which are constructed as interchangeable adapters. This makes it possible by using spacing rings 80 of different sizes, to adapt the fixing means to different tire sizes.

The fixing of an anti-skid device 10 comprising the supporting disk 20 with the anti-skid arms 40 to the rim or wheel 11 of a vehicle, whilst using the fixing means comprising fixing disk 50 and retaining ring 150 takes place in such a way that after fixing fixing disk 50 by means of the rim screws, wheel studs etc. 18 to rim 11, the supporting disk of the anti-skid device 10 is fitted to the hub 52 of fixing disk 50. The retaining ring 150 is then fitted, so that its locking webs 155 are placed in the gaps between the bulge-like shoulders 55 on hub 52. This is followed by the insertion of pressure tongues 72, 73 of unlocking key 70 into recesses 75 and then the rotation of key 70 in the direction of arrow X (FIG. 7), so that the retaining ring 150 is rotated about its central axis until the locking webs 155 on the inner wall face 150a of retaining ring 150 come to rest in the recesses forming the sliding and guiding paths 60. This is followed by the simultaneous self-resilient engagement of the leaf spring-like latches 160 in recesses 152 on hub 50, thereby bringing about locking against the unintentional release of retaining ring 50. Due to the fact that the free ends of the leaf spring-like latches 160 are located in stop-like recesses 152, a reliable locking is ensured. Due to the fact that these stopping recesses 152 are constructed in undercut manner and the free ends of the latches 160 have an approximately wedge-shaped configuration, it is ensured that latches 160 with their free ends cannot spring out of these stopping recesses 152.

Thus, the anti-skid device 10 is secured on the vehicle wheel rim 11 by means of the fixing means formed by the fixing disk 50 and retaining ring 150, in such a way that the anti-skid arms 140 of anti-skid device 10 engage over the tire tread.

The anti-skid device 10 is removed with the aid of unlocking key 70, which is once again introduced into recesses 75 with its pressure tongues 72, 73. Through the rotation of unlocking key 70, the leaf spring-like latches 160 are moved out of their locking position into their initial position in the recesses 156 on the inner wall face 150a of retaining ring 150. This is accompanied by a simultaneous rotation of retaining ring 150 until the locking webs 155 of said ring are removed from the sliding and guiding paths 60 on hub 52 after which ring 150 can be removed. This is followed by the removal of the supporting disk of the anti-skid device 10 from hub 52 of fixing disk 50. If the anti-skid device 10 remains out of use, but whilst keeping the fixing means ready, retaining ring 150 is merely mounted and locked on to the fixing disk 50, so that it is always possible to fit the anti-skid device 10, if this should prove necessary.

The supporting disk 20 of anti-skid device 10 is provided with a central opening so that the supporting disk 20 can be mounted on hub 52 of fixing disk 50. The diameter of this central opening is, however, larger than the diameter of hub 52, so that the supporting disk 20 of anti-skid device 10 held on hub 52 can perform eccentric movements. This makes it possible for the anti-skid arms 40 overlapping the tire tread and in conjunction with supporting disk 20, to adapt to the squeezing movements of the revolving tire. The diameter of the central opening in the supporting disk 20 is also dimensioned in such a way that the supporting disk 20 cn be guided by means of torus 57 on hub 52. The upwards securing of supporting disk 20 takes place by means of retaining ring 150 which sectionally overlaps said disk, whilst the fixing disk 50 exercises the necessary securing action towards the rim.

What is claimed is:

1. A non-skid device, particularly for pneumatic tires mounted on vehicle wheels for use on ice and snow, comprising a supporting disk arranged to be fixed to a wheel disk or rim of a vehicle wheel having a central axis about which the wheel rotates, said supporting disk having a plurality of equiangularly spaced, radially outwardly extending non-skid arms provided with a prebent profile so that said arms extend outwardly from said supporting disk to the circumferential periphery of the tire on the wheel and then are bent and project inwardly over the tire tread, said arms carrying thereon spike-like profiles arranged to extend over and outwardly from the tread, said arms being formed of a resilient elastic material, said anti-skid arms being pivotally mounted on said supporting disk for pivotal movement in a small range about axes parallel to the axis of the wheel; and further comprising (a) a circular fixing disk arranged for fixing said supporting disk to the wheel, said fixing disk having a central axis extending transversely of said fixing disk, said fixing disk having a plurality of openings therethrough, means positionable within the openings in said fixing disk for securing said fixing disk to the wheel, said fixing disk having a radially outer diameter, said fixing disk having an outwardly facing surface, extending transversely of said fixing disk central axis, said fixing disk includes a centrally located circular hub having a smaller diameter than the radially outer diameter of said fixing disk and projecting outwardly from said outwardly facing surface of said fixing disk, said hub having a plurality of bulge-like shoulders spaced circumferentially apart on said hub and spaced in the axial direction of said fixing disk from the outwardly facing surface of said fixing disk, each said bulge-like shoulder forming a sliding and guiding path located inwardly between said shoulder and said outwardly facing surface of said fixing disk and each of said paths extending in the circumferential direction of said hub, said sliding and guiding paths each having an insertion opening and an end area spaced apart in the circumferential direction of said hub with each said path having a wedge-like shape converging inwardly from the insertion opening toward the end area in the circumferential direction around said hub, a retaining ring mounted on said hub for securing said supporting disk thereon, said retaining ring having a radially inner wall surface with locking webs formed on the radially inner wall surface and each said locking web being insertable into a corresponding said sliding and guiding path for effecting a bayonet-like engagement of said retaining ring in said paths, each said locking web being tapered inwardly in the circumferential direction extending from the insertion opening toward the end area of the corresponding said sliding and guiding path, said retaining ring having at least one leaf spring latch formed on the inner wall surface thereof, said hub having at least one first recess in the outer circumferential surface thereof, said latch being displaceable generally in the radial direction relative to the axis of the wheel between a locked position in engagement within said at least one first recess in said hub and an unlocked position, said first recess having a stop member therein for engagement by said latch in the locked position, said retaining ring having a second recess therein aligned opposite said first recess in said hub so that in the unlocked position said latch can be displaced into said second recess;

(b) said supporting disk being fitted on said hub of said fixing disk with a certain clearance therebetween so that said supporting disk can perform eccentric rotary movements about said hub; and (c) said inner surface of said retaining ring is provided with two equiangularly spaced said leaf spring latches with said latches being pivoted in the locked position into corresponding said first recesses in said hub and in the unlocked position being displaceable into said second recesses in the inner wall face of said retaining ring, a key is arranged for displacing said leaf spring latches between the locked and unlocked position and said key comprises a grip-like handle having a first end and a second end, two laterally spaced pressure tongues located on the first end of said handle and extending generally perpendicular to said handle, and said pressure tongues being spaced apart corresponding to the spacing of said leaf spring latches.

2. A non-skid device, as set forth in claim 1, wherein an interchangeable adapter is arranged on said fixing disk for adapting said fixing disk to different vehicle wheels.

3. A non-skid device, as set forth in claim 1, wherein said means for securing said supporting disk to said wheel includes fastening screws arranged to be inserted into internally threaded bores on studs formed on the wheel.

4. A non-skid device, as set forth in claim 1, wherein said locking web has a length in the circumferential direction of said retaining ring corresponding approximately to the circumferential distance between two said bulge-like shoulders on said hub.

5. A non-skid device, as set forth in claim 1, including a vehicle wheel, said fixing disk being formed integrally with said vehicle wheel.

* * * * *